Figure 1:
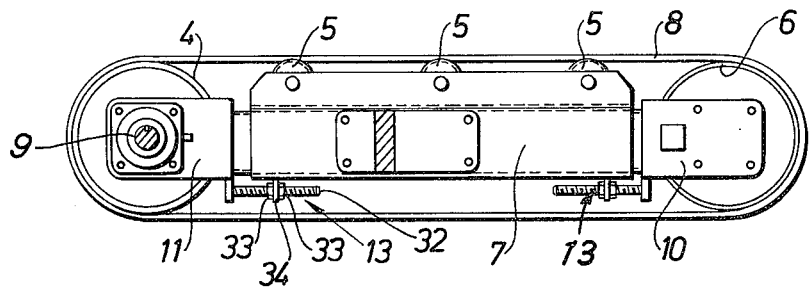

United States Patent [19]
Holmqvist et al.

[11] 3,952,861
[45] Apr. 27, 1976

[54] CONVEYOR BELT SUPPORT ASSEMBLY
[76] Inventors: Ture Rickard Leopold Holmqvist, Dalkarrsleden 36, 162 24 Vallingby; Adolf Gunnar Gustafson, Musseronvagen 18, 14146 Huddinge, both of Sweden
[22] Filed: June 26, 1974
[21] Appl. No.: 483,113

[30] Foreign Application Priority Data
July 9, 1973 Sweden.............................. 7309622

[52] U.S. Cl................................ 198/204; 198/208
[51] Int. Cl.$^2$................................... B65G 15/60
[58] Field of Search ........... 198/208, 202, 190, 204, 198/1

[56] References Cited
UNITED STATES PATENTS
2,612,988 10/1952 Andrews............................. 198/208
2,695,702 11/1954 Ellen................................... 198/208
2,955,701 10/1960 Schwertl......................... 198/208 X
2,957,572 10/1960 Dvorak............................... 198/190
3,164,027 1/1965 Rood, Jr. ...................... 198/208 UX
3,835,982 9/1974 Zappia................................ 198/204

FOREIGN PATENTS OR APPLICATIONS
1,491,186 9/1966 France................................ 198/208

Primary Examiner—Robert J. Spar
Assistant Examiner—James M. Slattery
Attorney, Agent, or Firm—Wolfe, Hubbard, Leydig, Voit & Osann, Ltd.

[57] ABSTRACT

A belt conveyor construction in which narrow belts are trained about rollers supported on square flanged holders that slidably fit in opposite ends of square spacers. Simple screws adjust belt tension and secure the holders in the spacers. The weight supporting run of the belts pass over flanged support rollers journalled on the spacers, and the support roller flanges extend less than the thickness of the belts.

4 Claims, 8 Drawing Figures

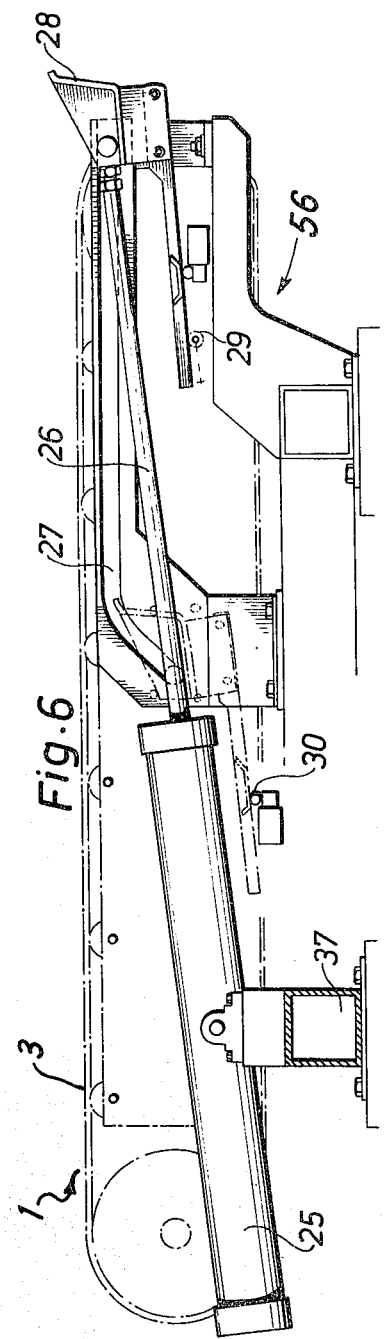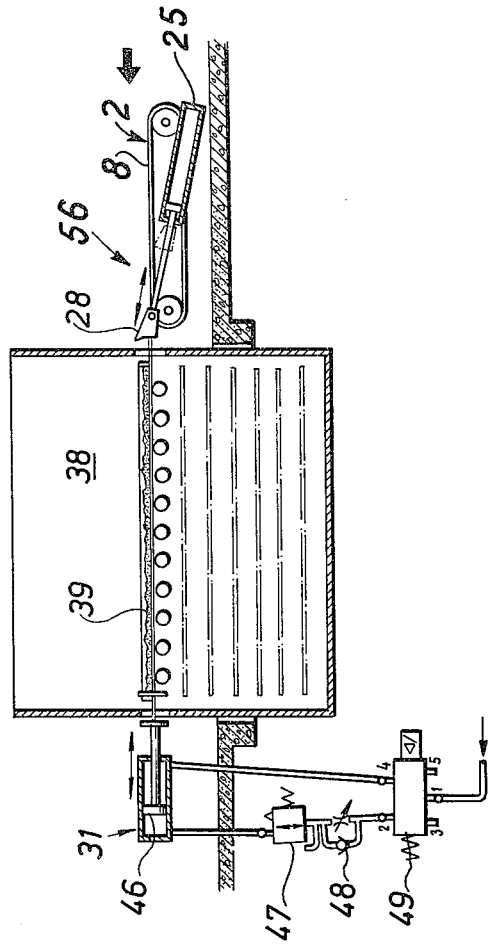

CONVEYOR BELT SUPPORT ASSEMBLY

This invention relates to a belt conveyor which comprises an endless belt surrounding a drive roller provided for driving of the belt and an idling roller, the said rollers each being rotatably carried between the shanks of a fork-shaped holder and arranged to be movable in relation to each other, the said holders being mechanically connected via a tube.

Prior known transport systems in the manufacture of fibreboard sheets, where for example roughly 8 m long plates weighing from 200 to 500 kgs. are provided with a wet sheet consisting of unpressed fibre pulp, which plates together are fed into a hot press, have numerous disadvantages. Examples of these are that metallic contact frequently exists between the plate and the transport system, resulting in the generation of loud noise and the production of marks in the plate surface which can give rise to flaws in the manufactured fibreboard, and moreover, if a somewhat uneven plate is transported it can become skewy, which jeopardizes an exact placing of the wet sheet on the plate. In earlier designs use has commonly be made of sprockets with chains, which give a large amount of play when exact impulses ae given for stop, etc., and which require expensive maintenance. In addition, reusing of the plates has been costly to achieve, since a continuous circuit for these could not be practically arranged without large and intricate designs.

Other difficulties with similar transport systems were that the transport belts were broad and consequently difficult to adjust, expensive to purchase and complicated to change. Moreover, intricate, custom-built transport system solutions were often demanded, and great difficulties were involved in incorporating actuating means which actuated the transported objects in a transportwise correct position.

Other disadvantages of known belt conveyors are the difficulty of achieving exact alignment of the drive and idling rollers in relation both to each other and to the belt and the difficulty of being able to remove or change the belt without comprehensive measures.

An object of the present invention is to decrease or eliminate the aforesaid disadvantages but also to provide a belt conveyor which is easily and readily adaptable in size to different needs and which is usable in a transport system where the belt conveyors are arranged pairwise parallel in belt conveyor units, which are arranged in relation to one another in a transport system so as to be able to convey objects in different directions.

The aforesaid disadvantages have been eliminated or reduced by elaborating a belt conveyor in accordance with the characterising clause of claim 1.

A closer description of parts of the invention is given in the following account of a transport system intended and specially adapted for use in the manufacture of fibreboard sheets.

Figure 2:
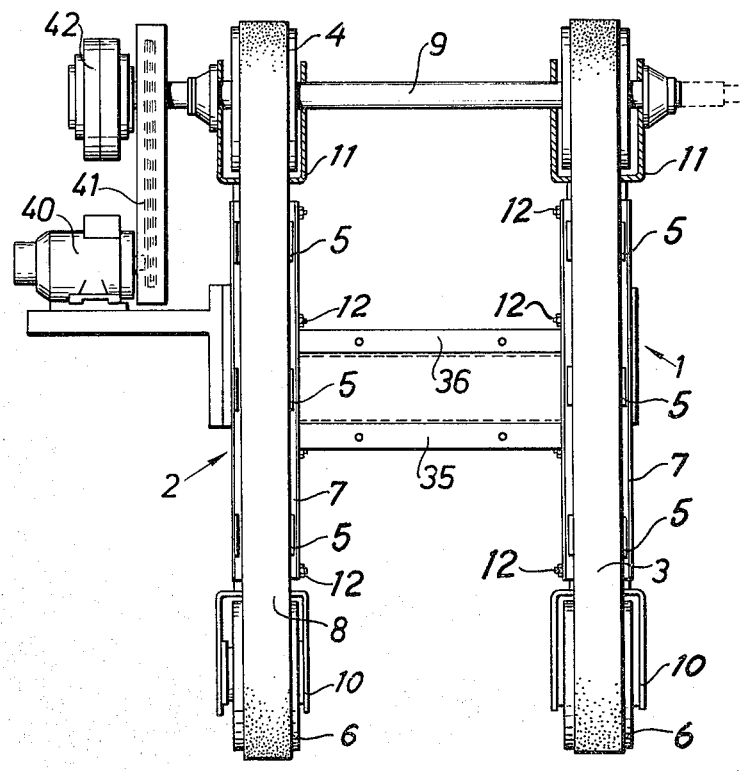
Figure 3:
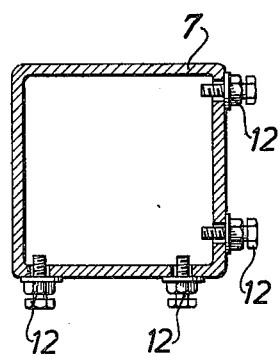
Figure 4:
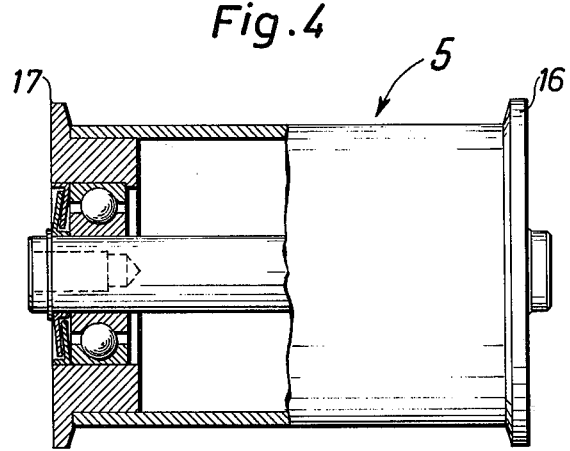
Figure 5:
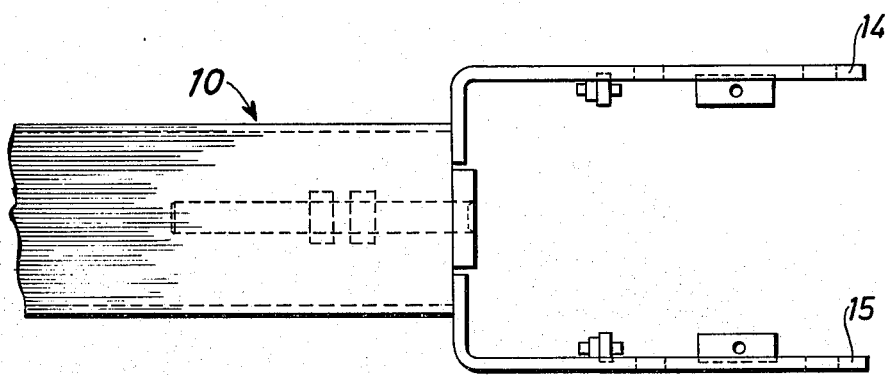
Figure 8:
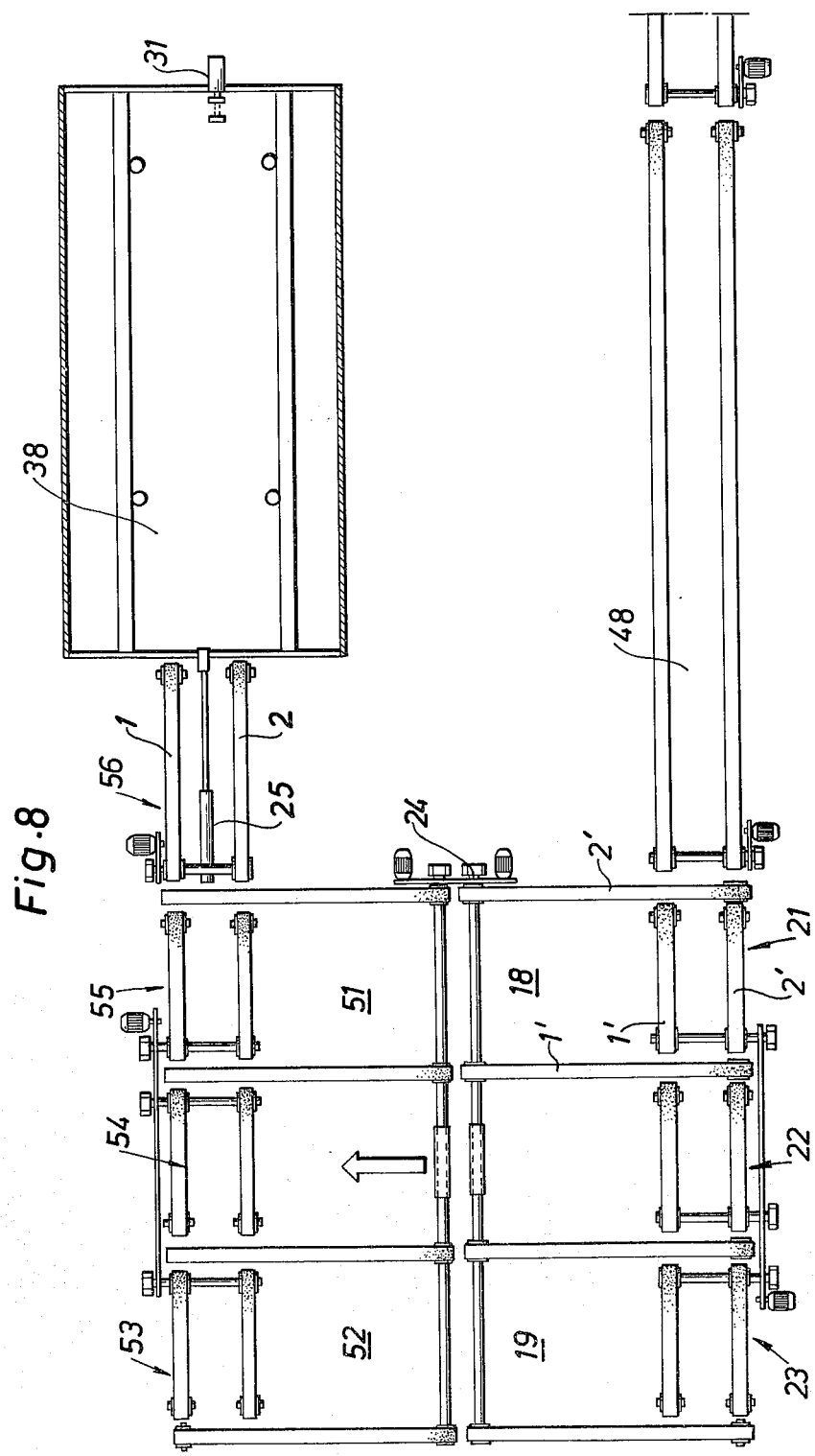

In the drawings accompanying the description:
FIG. 1 is a side view of a belt conveyor unit;
FIG. 2 is a plan view of the same unit;
FIG. 3 is a section through a square tube;
FIG. 4 is a view, partly sectioned, of a support roller;
FIG. 5 is a plan view of a holder;
FIG. 6 is a side view of an infeeder;
FIG. 7 is a principle sketch of a damping device; and
FIG. 8 is a plan view of part of a transport system in which the invention has been applied.

Shown in FIG. 1 is a side view of a belt conveyor unit, the elaboration of which in principle is applicable in different parts of a transport system. An account of the design of this unit will first be presented, following which designs specifically adapted to this unit will be described and finally, parts will be shown of a complete transport system in which the unit is included but has different elaborations adapted to the actual needs encountered.

The belt conveyor unit comprises two, preferably parallel working belt conveyor sections 1, 2, each of which comprises a belt 3, a drive wheel 4 driving the said belt, an idling roller 6, one or a plurality of support rollers 5 and a connecting device, which appropriately comprises a square tube 7 (see FIG. 3). The drive and support rollers 4, 6 are mounted in holders 10, 11, one part of which is provided with two fork-shaped arms 14, 15 (see FIG. 5) between which the drive and support roller, respectively, is adjustably mounted, and the other part of which, viewed in cross-section, is preferably made box-shaped and arranged to be insertable in the square tube 7.

The drive for the drive rollers 4 comprises for instance a brake motor 40, a V-belt 41 and a journal gear 42.

The tube 7 is cut off from a standardized square tube and is provided on two sides with attachment means 12 in the form of welded-on nuts into which screws are screwed in, thus clamping the box-shaped parts of the holders against the other two sides of the tube. The length of the tube 7 is chosen with respect to the desired belt conveyor length.

Centrally sited between each holder 10 and 11, respectively, and the tube 7 is a tensioning device 13 by means of which the belt tension can easily be adjusted. The tensioning device 13 consists of a threaded pin 32 attached to the holder, which pin via its threads and two nuts 33 interacts with a holed brace 34 attached to the tube 7. In changing belts or adjusting the belt tension it is thus only necessary for the tensioning device 13 to be actuated, whereupon the belt is moved sideways over the drive section without it being necessary to unfasten any further part, since the unit is supported by its centrally sited lateral braces 35, 36 between the belts 3 and 8.

Support rollers 5 can also be mounted on the tube 7 if required and these rollers are provided with flanges 16, 17, the extent of which in the radial direction of the respective support roller is less than the extent of the belt in the same direction in order to steer the belt sideways if such forces are encountered (see FIG. 4).

As mentioned previously, each belt conveyor unit comprises two belt conveyor sections 1, 2. These sections are preferably interconnected by means of a common drive shaft 9 for the two drive rollers included in the unit and are also interconnected, as already mentioned, by means of lateral braces 35, 36 (see FIG. 2).

FIG. 6 shows a side view of a unit 56 including an infeeder which is intended specifically for use in connection with a belt conveyor unit as above. The stationary part 25 of the infeeder is swivelable in a foundation 37 and its moving part 26 is mechanically coupled to a driver 28. This is steered in its motion by a groove 27, the appearance of which is such that the driver 28 in one position is located below or possibly above the plane formed by interconnection of the deposit surfaces of the belts 3, 8 but runs rapidly up to the said plane and moves in this. The infeeder is sited between sections 1 and 2 of the belt conveyor unit and in its end position the driver 28 actuates switches 29 and 30.

FIG. 7 shows unit 56 positioned for feeding of plates with wet sheets into a load-in elevator 38. In this elevator it is essential that the plate 39 with its wet sheet be placed correctly in position and that braking does not take place all too rapidly, as otherwise the wet sheet can be moved out of its intended position. Braking takes place by means of a damping device 31 which is so elaborated that when a signal is emitted from the switch 30 actuated by the driver 28 an electric valve 49 switches and supplies a pressure regulator 47 with an air pressure exceeding the necessary air pressure. The adjustable pressure regulator 47 then provides the rear of the damping piston 46 with a suitable air pressure for damping of the plate. When an entering plate with wet sheet 39 strikes the protruded damping piston 46 of the damping device 31, the pressure at the back of the cylinder rises and that part of a pressure set on the pressure regulator 47 which exceeds the set pressure is shunted out by means of the pressure regulator 47, i.e. the damping force remains the same over the entire damping distance. During the entire damping distance the driver 28 of the infeeder pushes on the rear edge of the plate until the driver 28 reaches its outermost position, whereupon the switch 29 is activated and actuates a time-delay relay (not shown), which both delays the switching of the electric valve 49 for return of the damping piston 46 and briefly delays the return of the driver 28 in order to ensure that the plate has stopped completely before the damping piston 46 and the driver 28 return. After the said brief delay, the electric valve 49 then supplies the front side of the damping piston with such a pressure that the piston returns to its completely inserted position. In principle, the piston thus has three different positions, which counted from left to right according to FIG. 7, are the starting position, the damped position and the damping position. The damping distance comprises for example roughly 75% of the total cylinder stroke. When in the starting position, the damping piston is sited beyond the plane formed by interconnection of the front edges of the plates. The driver 28 is also situated in its unactuated state beyond the plane formed by interconnection of the rear edges of the plates. The elevator thus becomes free to perform a raising or lowering movement. This form of infeed is repeated until all the elevator floors are filled with plates 39.

The throttle and check valve 48 serves to regulate the speeds of the damping piston in the two movement directions.

Referring to FIG. 8, a description will be given of a transport system for the manufacture of fibreboard sheets. At the bottom right in the said figure a plate, which in an earlier stage has been provided with a wet, cut-off wood-fibre mat, enters the conveyor unit 48, which carries the plate to three synchronously driven belt conveyor units 21, 22 and 23 placed in a row. These units, in their turn, are placed between two units 18 and 19, which are placed parallel with each other and are driven by a common, but appropriately dividable shaft 24 and which around this shaft are also vertically adjustable by means of air bellows (not shown). Units 18 and 19 are raised by means of the air bellows so that the plate is lifted off the units 21–23 and fed in a direction perpendicular to the previous direction. A set of belt conveyor units corresponding to units 21–23 and 18–19 but reversed now takes over the transport of the plate. Units 51 and 52 are then located first in a position where they are raised by the air bellows, but when the plate comes into position above the units 53–55, units 51 and 52 are lowered so that the plate makes contact with units 53–55. They then feed the plate into unit 56, which is provided with the previously described infeeder, which feeds the plate into an elevator floor in the elevator 38. The elevator is provided with the above indicated damping device 31. When all floors of the elevator 38 have been filled in the aforesaid manner with plates, or if so preferred frames, with wet sheets, the plates are led into a hot press (not shown) which presses out the water and dries wet sheets into finished fibreboard sheets. The plates with the finished fibreboard sheets are then pulled out of the press, whereupon the finished sheets are separated from the plates by means of suction cups which lift the sheets, the plates being carried by belt conveyor units working in accordance with the same principle as described heretofore to a position in which new wet sheets are again put on them. The process is then repeated as above.

In the above transport system, the units 18, 19, 21–23 and 51–55 all comprise sections 1' and 2' corresponding to sections 1 and 2 described above, and the resulting system is usable for both plates and for frames which are charged with wet sheets.

As evident from the above, the same parts are utilized in the belt conveyors and in the belt conveyor units in different ways in the transport system by giving each unit an adapted size of included belts and square tubes. Other parts, such as holders, drive and idling rollers, support rollers, etc., consist of standard units which can be utilized in all applications or which can easily be modified to fit in individual cases. Switching of transport directions can, as is evident from the above description, easily be achieved and in addition the actuating means can actuate the transported objects in a line which passes through the centre of gravity.

What we claim is:

1. In a belt conveyor having an endless belt trained around both a drive roller and idling roller journalled respectively within the arms of fork-shaped holders, the improvement comprising a tube interconnecting, spacing and alining said holders, said tube being non-round in cross section, said holders having correspondingly non-round shanks slidably fitted into the opposite ends of said tube so as to adjust the spacing of said rollers, the longitudinal axes of said tube and said shanks being substantially alined with and intersecting the axes of said rollers, and attachment means for fixing the tube and holders in adjusted position, whereby said holders, shanks and tube provide a rigid adjustable frame centered within and supporting said belt, said attachment means including screws threaded through said tube so as to bear on and force said shanks into a non-rounded corner of said tube.

2. The combination of claim 1 in which said tube and said shanks are square in cross section.

3. The combination of claim 1 including an adjustable tensioning device interconnecting said tube and one of said holders and being positioned in the plane of said belt.

4. The combination of claim 1 including flanged support rollers journalled on said tube and underlying said belt, the flanges on said rollers being of lesser radial thickness than said belt.

* * * * *